United States Patent [19]
Malloy et al.

[11] Patent Number: 5,311,066
[45] Date of Patent: May 10, 1994

[54] UNIVERSAL PHASE MATCH PATH GENERATOR FOR THREE-PHASE POWER

[75] Inventors: Stephen J. Malloy, Manassas; Kirk J. Treubert, Fairfax, both of Va.

[73] Assignee: International Business Machines Corporation, Armonk, N.Y.

[21] Appl. No.: 106,324

[22] Filed: Aug. 13, 1993

Related U.S. Application Data

[63] Continuation of Ser. No. 876,668, Apr. 3, 1992, abandoned.

[51] Int. Cl.⁵ ............................................. H02J 3/00
[52] U.S. Cl. ........................................ 307/87; 307/66; 307/64; 307/82
[58] Field of Search .............. 307/87, 19, 20, 23, 307/29, 43–47, 64, 68, 84, 87, 82, 52; 361/44, 47, 48, 51, 20, 21

[56] References Cited

U.S. PATENT DOCUMENTS

| 4,021,704 | 5/1977 | Norbeck | 361/77 |
| 4,667,264 | 5/1987 | Yamazaki et al. | 361/77 |
| 4,761,563 | 8/1988 | Ross et al. | 307/87 |
| 4,937,462 | 6/1990 | Recker et al. | 307/19 |
| 5,182,464 | 1/1993 | Woodworth et al. | 307/87 |

Primary Examiner—Sharon D. Logan
Assistant Examiner—Aditya Krishnan
Attorney, Agent, or Firm—Mark A. Wurm

[57] ABSTRACT

A method for the transferring of 3 phase, asynchronous AC power between a present source supplying power to a load and an alternative source to supply power to the load. The maximum phase displacement is 60 electrical degrees at the load. The transfer can occur between sources which are rotating "forward" or "backward" with respect to each other or jointly with respect to the load. Either present source, alternate source or the load may be used as the timing reference for determining best phase connection of the alternate source to the load.

3 Claims, 9 Drawing Sheets

FIG. 5

|  | | load polarity | | | | | |
|---|---|---|---|---|---|---|---|
|  | | 001 | 010 | 011 | 100 | 101 | 110 |
| new source polarity | 001 | 1 | 3 | 1 | 2 | 2 | 3 |
|  | 010 | 2 | 1 | 2 | 3 | 3 | 1 |
|  | 011 | 2 | 1 | 1 | 3 | 2 | 3 |
|  | 100 | 3 | 2 | 3 | 1 | 1 | 2 |
|  | 101 | 1 | 3 | 3 | 2 | 1 | 2 |
|  | 110 | 3 | 2 | 2 | 1 | 3 | 1 |

FIG. 6

|  | | load polarity | | | | | |
|---|---|---|---|---|---|---|---|
|  | | 001 | 010 | 011 | 100 | 101 | 110 |
| new source polarity | 001 | 1 | 3 | 3 | 2 | 1 | 2 |
|  | 010 | 2 | 1 | 1 | 3 | 2 | 3 |
|  | 011 | 1 | 3 | 1 | 2 | 2 | 3 |
|  | 100 | 3 | 2 | 2 | 1 | 3 | 1 |
|  | 101 | 3 | 2 | 3 | 1 | 1 | 2 |
|  | 110 | 2 | 1 | 2 | 3 | 3 | 1 |

FIG. 7 load polarity
                          |
        ┌─────────────────────────────────────┐
        001   010   011   100   101   110

| new source polarity | 001 | 010 | 011 | 100 | 101 | 110 |
|---|---|---|---|---|---|---|
| 001 | 6 | 4 | 6 | 5 | 5 | 4 |
| 010 | 4 | 5 | 4 | 6 | 6 | 5 |
| 011 | 6 | 4 | 4 | 5 | 6 | 5 |
| 100 | 5 | 6 | 5 | 4 | 4 | 6 |
| 101 | 5 | 6 | 6 | 4 | 5 | 4 |
| 110 | 4 | 5 | 5 | 6 | 4 | 6 |

FIG. 8 load polarity
                          |
        ┌─────────────────────────────────────┐
        001   010   011   100   101   110

| new source polarity | 001 | 010 | 011 | 100 | 101 | 110 |
|---|---|---|---|---|---|---|
| 001 | 6 | 4 | 4 | 5 | 6 | 5 |
| 010 | 4 | 5 | 5 | 6 | 4 | 6 |
| 011 | 4 | 5 | 4 | 6 | 6 | 5 |
| 100 | 5 | 6 | 6 | 4 | 5 | 4 |
| 101 | 6 | 4 | 6 | 5 | 5 | 4 |
| 110 | 5 | 6 | 5 | 4 | 4 | 6 |

FIG. 9

|  | \ | 1 | 2 | 3 | 4 | 5 | 6 |
|---|---|---|---|---|---|---|---|
| | | | | present path | | | |
| | 001 | 001 | 100 | 010 | 010 | 100 | 001 |
| | 010 | 010 | 001 | 100 | 001 | 010 | 100 |
| present source polarity | 011 | 011 | 101 | 110 | 011 | 110 | 101 |
| | 100 | 100 | 010 | 001 | 100 | 001 | 010 |
| | 101 | 101 | 110 | 011 | 110 | 101 | 011 |
| | 110 | 110 | 011 | 101 | 101 | 011 | 110 |

FIG. 10

| timing reference | New source rotation | Load rotation | Use Figure |
|---|---|---|---|
| load/pres | ABC | ABC | 6 |
| load/pres | ABC | ACB | 7 |
| load/pres | ACB | ABC | 8 |
| load/pres | ACB | ACB | 5 |
| new | ABC | ABC | 5 |
| new | ABC | ACB | 8 |
| new | ACB | ABC | 7 |
| new | ACB | ACB | 6 |

' # UNIVERSAL PHASE MATCH PATH GENERATOR FOR THREE-PHASE POWER

This application is a continuation of application Ser. No. 07/876,668, filed Apr. 3, 1992, now abandoned.

DESCRIPTION

Background of the Invention

1. Technical Field

The invention disclosed broadly relates to the switching of multi-phase electrical power sources, and more particularly, relates to the precise matching of the relative phases in a multi-phase system for switching between two power sources and a load which may be rotating either clockwise or counterclockwise with respect to each other or to the load.

2. Background Art

There are numerous applications where it is necessary or desirable to disconnect one or more loads from one power supply and to connect the loads to another power supply with minimum disruption in the load current. In aircraft and aerospace applications, as well as submarines, a load transfer may be required between power sources external to the aircraft and on-board the aircraft or between separate on-board power sources. When the load is a motor driven device, it is important to apply the correct phase voltages to the motor in correct sequence, or the motor will rotate in the wrong direction and will not function properly. In many applications a reverse phase sequence of voltage applied to a pump causes the pump to rotate in the reverse direction and not perform any pumping action. To change the rotational direction for pumping, an operator must change manually the phase sequence of the electric power supplied to the three-phase motor by, for example, changing the connections of wires to the supply terminals of an electric panel board.

What is needed is a means to allow for the transfer of power to occur between a present source for supplying power to a load and a new source which will supply power to the load, with a maximum phase displacement of 60 electrical degrees at the load. This transfer must occur between sources which are rotating "forward" or "backward" with respect to each other or jointly with respect to the load, and to allow the use of the present source, new source or load as a necessary timing reference for determining the best connection of the three-phases of the new sources to the load. An asynchronous multi-phase switching gear is disclosed in U.S. Pat. No. 07/4,761,563 to Ross et al., August 1988. A means for matching the phase between two, three-phase power sources is disclosed in U.S. Pat. application Ser. No. 07/592,748 to Gaddis, filed October 1990, now U.S. Pat. No. 5,212,407 the teachings of the Ross Patent and the Gaddis Patent are hereby incorporated by reference.

The present application, the Ross, et. al. and Gaddis, et. al. patents are commonly assigned.

SUMMARY OF THE INVENTION

The invention allows for the removal of restrictions on the rotation directions of power sources of polyphase power supplies being connected to the load. This is accomplished by having two control signals derived from the configuration of the power system, one of which indicates the desired rotation direction of the load and the second one indicates to a controller the device which is being monitored to provide a timing reference for the electrical signal selection.

BRIEF DESCRIPTION OF THE DRAWINGS

These and other objects, features and advantages of the invention will be more fully appreciated with reference to the accompanied figures.

FIG. 5 is a table showing the selection matrix for load and new source polarity.

FIG. 6 is a matrix table showing the polarity states at the time of transfer.

FIG. 7 is a table showing a selection matrix.

FIG. 8 is a table for determining electrical path connections.

FIG. 9 is an alternate table showing path selections.

FIG. 10 depicts a solution matrix selector for given conditions of timing.

Fig, 13 is a schematic of a polarity change detector.

Figure 14:
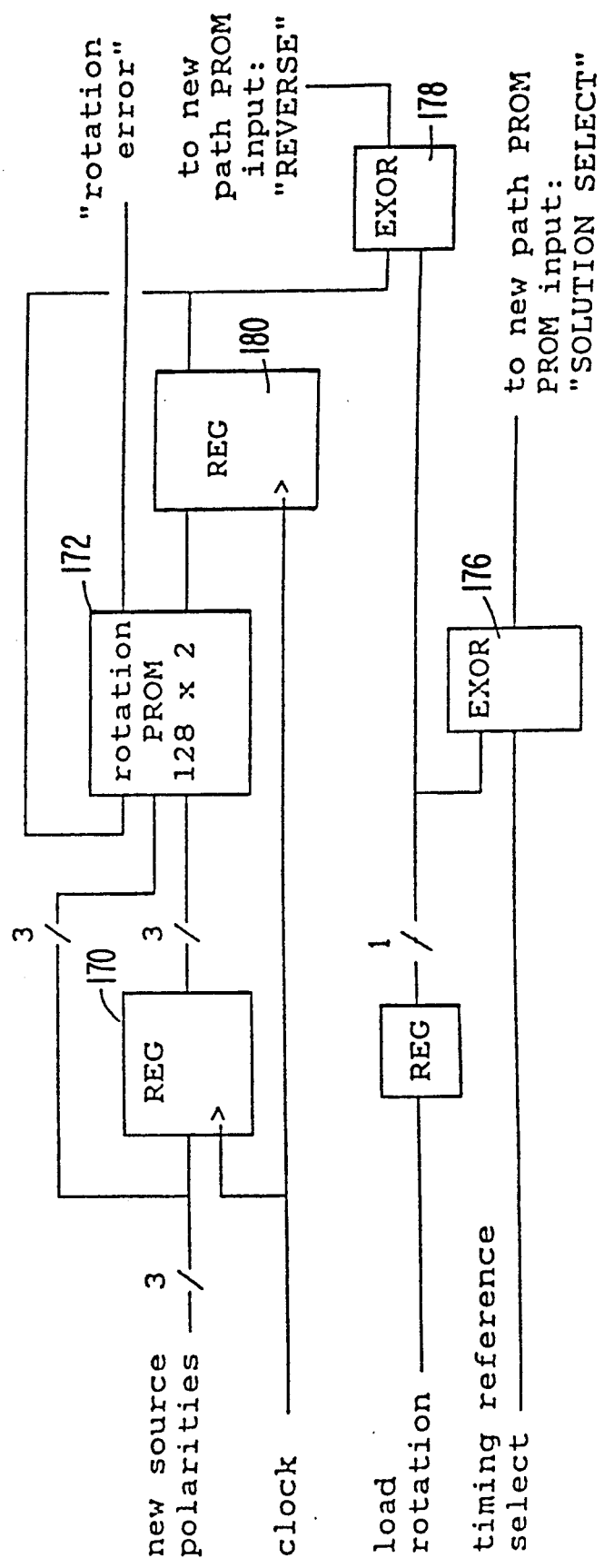

FIG. 14 is a schematic of a new source rotation detector.

DESCRIPTION OF THE BEST MODE FOR CARRYING OUT THE INVENTION

The invention allows for the removal of restrictions on the rotation direction of the sources or the load and allows for the timing reference to be derived from the new source as well as from the present source or the load. The definition of three additional paths for connecting the source to the load (for a total of 6 paths) allows any source to be rotating in the opposite direction from the desired load rotation without requiring this to be a fatal system error as in Ross et. al.

The invention requires two control signals which are derived from the configuration of the power system. These control signals may be provided by an external controller, by dedicated circuitry, or may be hardwired to set values if the system configuration will not be changed. The control signals are (1) an indication of the desired rotation direction of the load, either ABC or ACB; (2) an indication of which device is being monitored for the timing reference (a new source, present source, or load).

To represent the present path as a 1-of-6 selection, a minimum of 3 select signals must be utilized to identify the present path, in contrast to only 2 signal lines required for a 1-of-3 selection. The new path is also represented as a 1-of-6 selection, using a minimum of 3 select signals.

In the invention, the minimum size of the new path PROM is 256 by 3 when the load and new source polarities (minimum 3 bits each) are used as inputs, and 2048 (2K) by 3 when the present and new source polarities and the present path (minimum 3 bits) are used as inputs. The new path PROM processes 2 new inputs from the new source rotation detector; therefore, the minimum number of PROM inputs required for the load and new source implementation is 8 and the minimum number required for the two source and present path implementation is 11. The output register for the new path PROM is 3 bits wide.

This invention also includes a new source rotation detector, consisting of the circuit elements shown in FIG. 14. The new source rotation detector is discussed later.

Figure 13:
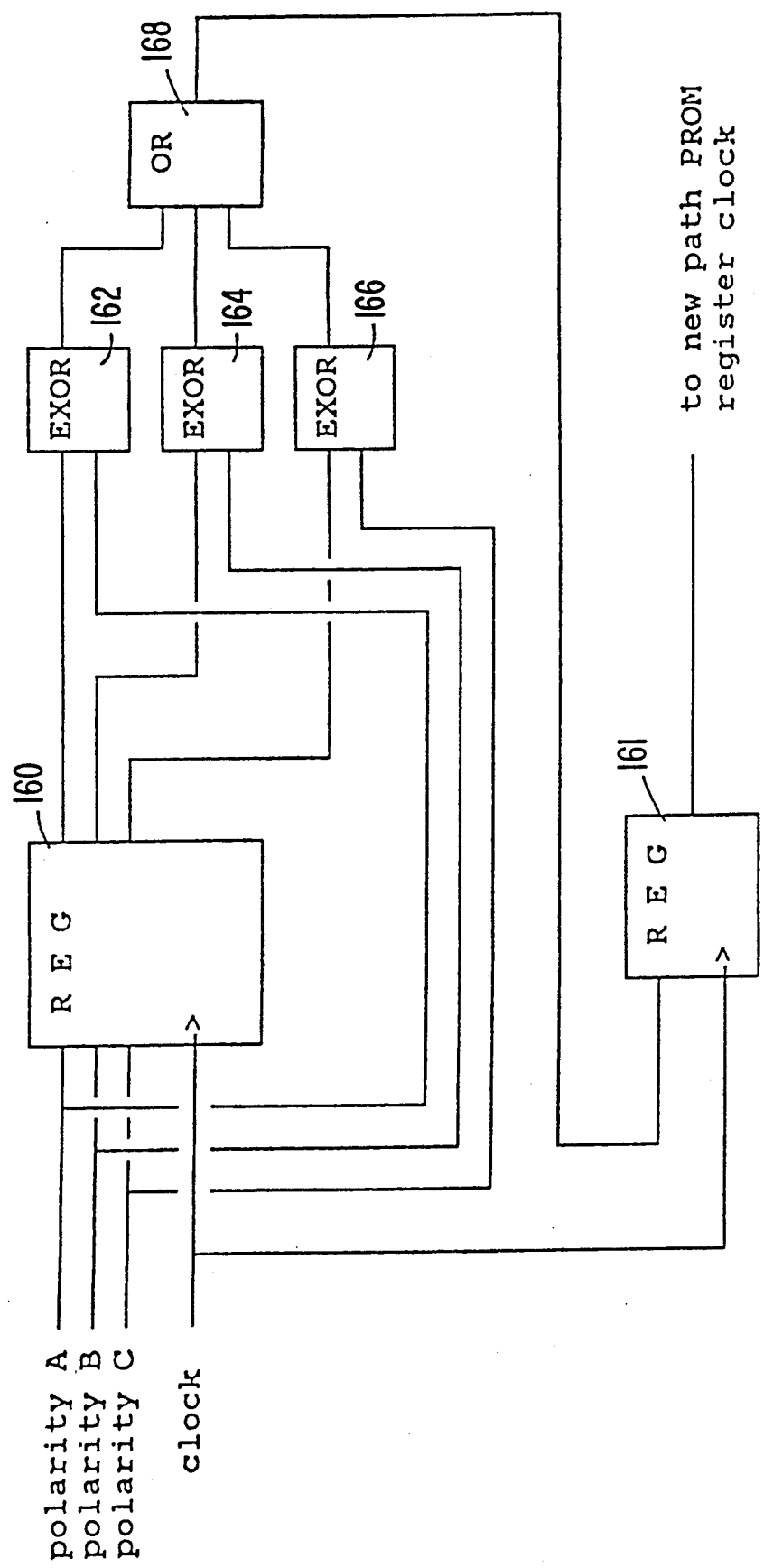

The internal circuitry of the polarity change detector, shown in FIG. 13, is the Same as previously et. al.; the only difference is that the new source polarities may be used as inputs to this circuit, subject to the requirements which are discussed later.

It is critical to resolve the relative positions of two asynchronous AC sources so that a transfer of power applied to a load network from the present source of power to a new or alternate source of power may be accomplished with a phase displacement of no more than 60 electrical degrees (plus a possible small sampling error) occurring at the load. The invention uses a timing reference derived from the position of one of the power system devices as the reference for determining the closest phase alignment of the new source to the phase position of the load. The phase match path generator outputs a set of signals defined as the "New Path" which indicates the best method for connecting the phases of the new source to the phases of the load to achieve a transfer of power between sources with a desired minimal disturbance to the load. The output of the detection circuit is synchronized with the changes of position of the reference device, that is, the device used for timing. Digital values are used as a representation of the present source, new source and load polarities and the clock. Implementation of the invention uses a polarity change detector, new path PROM and PROM output register, with the latching of the new path PROM outputs into the PROM output register synchronized to the output of the polarity change detector.

As disclosed in Gaddis et. al., a 3 phase waveform can be represented by 6 distinct states of 60 electrical degrees each. A state transition occurs when one of the three phases crosses zero volts, either going from a positive to a negative voltage or from a negative to a positive voltage. If a positive voltage is represented by a logical "1" and a negative voltage is represented by a logical "0", then for a complete 360 degree rotation, each phase will consist of three states where the voltage is positive and three states with a voltage negative; i.e. 3 logical "1"s and 3 logical "0"s. If the three phases are spaced at 120 degree intervals (because 360 degrees divided by 3 is 120 degrees), which is assumed for a three phase power system and if the A phase is used as a reference for labeling the angular position of the three phase source (i.e. at 0 degrees, 60 degrees, 120 degrees, etc.), then the polarities of a three phase source (or load) may be represented as follows for the specific rotation direction of the source (or load), either ABC or ACB:

| Ang. Position (Phase A) | Rotation Dir. | A-B-C Polarities |
| --- | --- | --- |
| 0 | ABC | 1-0-1 |
| 60 | ABC | 1-0-0 |
| 120 | ABC | 1-1-0 |

-continued

| Ang. Position (Phase A) | Rotation Dir. | A-B-C Polarities |
| --- | --- | --- |
| 180 | ABC | 0-1-0 |
| 240 | ABC | 0-1-1 |
| 300 | ABC | 0-0-1 |
| 0 | ACB | 1-1-0 |
| 60 | ACB | 1-0-0 |
| 120 | ACB | 1-0-1 |
| 180 | ACB | 0-0-1 |
| 240 | ACB | 0-1-1 |
| 300 | ACB | 0-1-0 |

Note that the sequence of polarity states for a device rotating in the ACB direction is the reverse of the sequence for a device which is rotating in the ABC direction. Note also the difference between the ABC and ACB polarities for each angular position is that the B and C polarities are swapped. By extension of this observation, it can be shown that reversing the connection of any two phases of a 3 phase power device will cause that device to appear to be rotating in the opposite direction from what may be the intended rotation when all phases are correctly wired.

Reversed phase wiring is not an uncommon problem in power systems. Repairing reversed phases usually involves removing the faulty device from the system, disassembling it, correcting the wiring, reassembling the device and restoring the device to the system.

Figure 1:
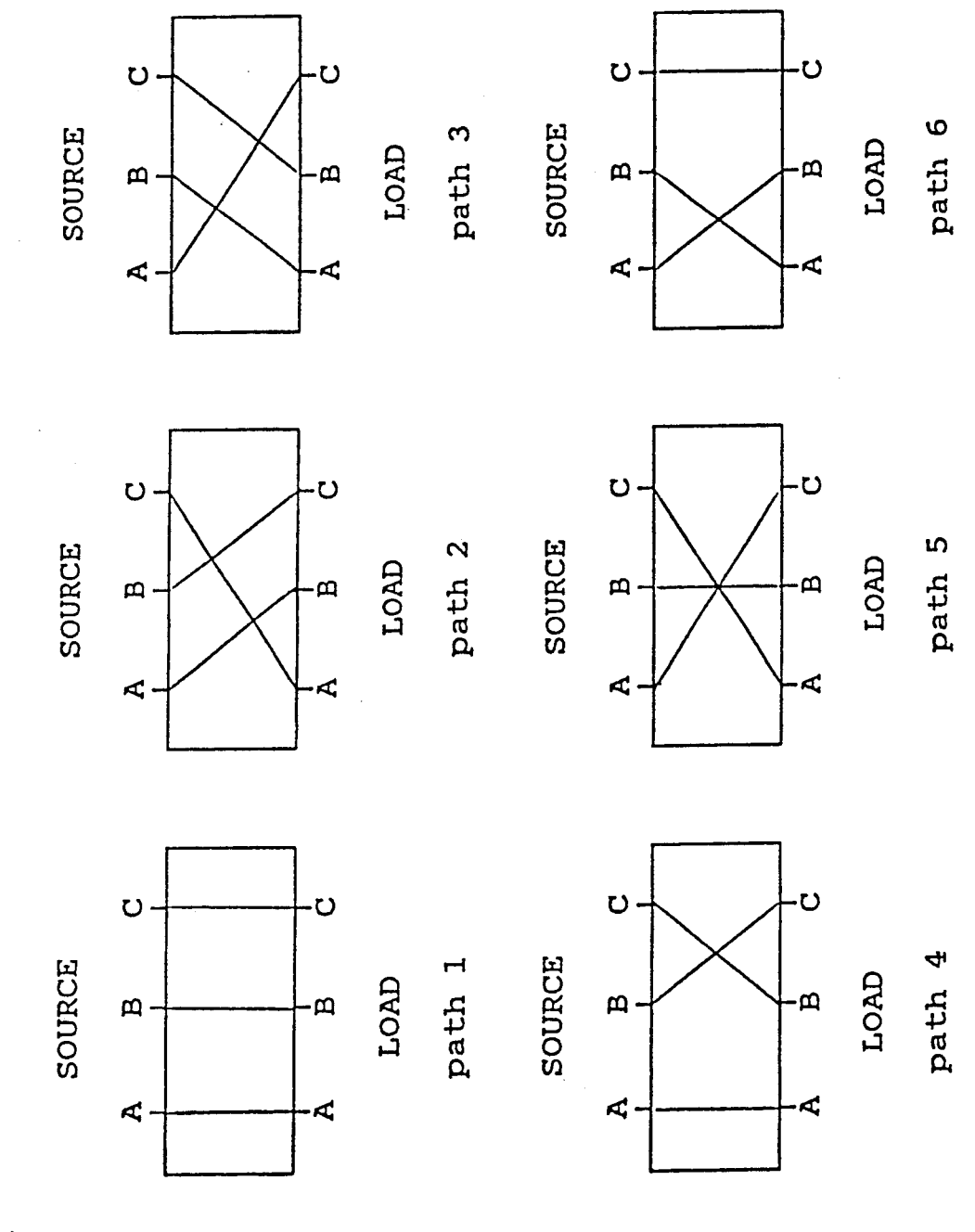
FIG. 1 is a diagram showing the six possible match-ups between the source and the load.

There are 3 possible ways to connect the source to a load which will preserve the phase rotation of the load, assuming that the source is rotating in the same direction as the load. Paths 1, 2 and 3, shown in FIG. 1, maintain the direction of rotation of the load when the source is rotating in the same direction.

This invention allows for reversed phase machines, or machines which may be physically rotating in the opposite direction from the desired load rotation, to provide the desired phase rotation to the load without having to remove, repair or correct rotation problems at the machine level. The definition of 3 additional paths, shown as paths 4, 5 and 6 in FIG. 1, allow the rotation to be reversed between the source and the load. Path 4 connects source phase A to load phase A, source B to load C and source C to load B. Path 5 connects source A to load C, source B to load B and source C load to load A. Path 6 connects source A to load B, source B to load A and source C to load C. As an illustration, using path 4 where the source is rotating in the ACB direction and the desired load rotation is in the ABC direction, the source sequence ACB maps to a load rotation sequence of ABC.

Figure 2:
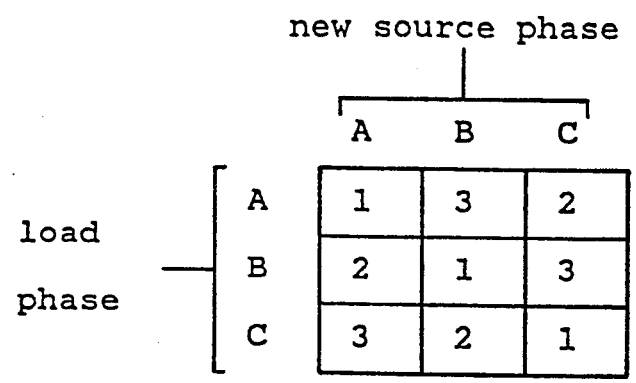
FIG. 2 is a truth table of the path selection for new source and load rotating in the same direction.
Figure 3:
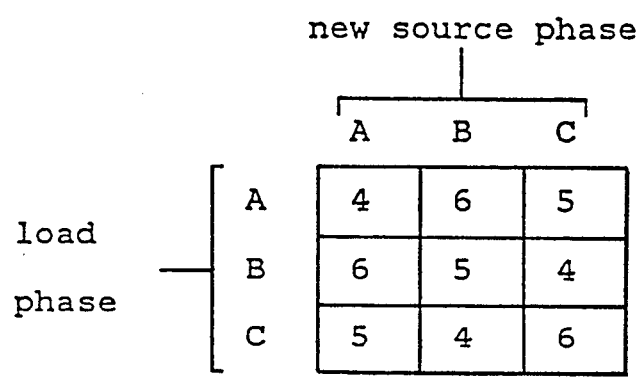
FIG. 3 is a truth table for the new path selection for new source and load rotating in opposite directions.

Generally, the selected new path allows the phase of a new source which is nearest to a reference load phase to be connected to that reference phase, with the remaining two source to load phase connections defined by the new path. FIGS. 2 and 3 show which new path needs to be selected for a transfer to occur with no more than a 60 degree phase displacement at the load. To use the figures, a reference phase is selected from the load (source) and the nearest phase of the source (load) is identified. FIG. 2 is used for systems where the new source and the load are rotating in the same direction. FIG. 3 is used for systems where the new source and load are rotating in opposite directions.

Figure 4:
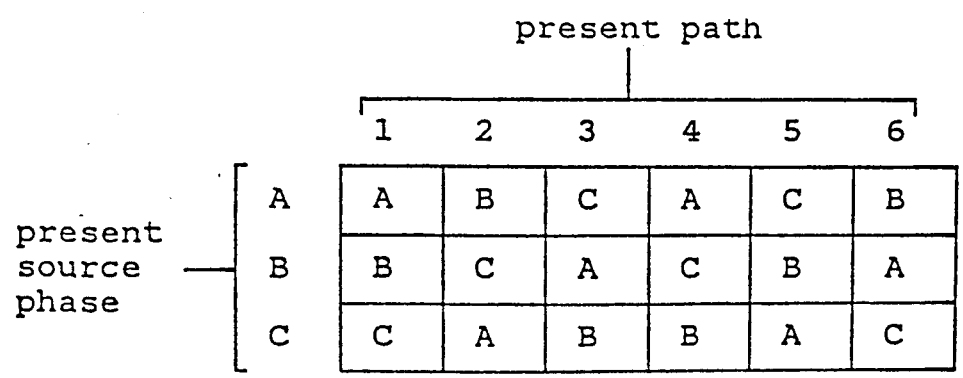
FIG. 4 is a truth table for the selection of load phase to be used when present and new source polarities are known.
Figure 12:
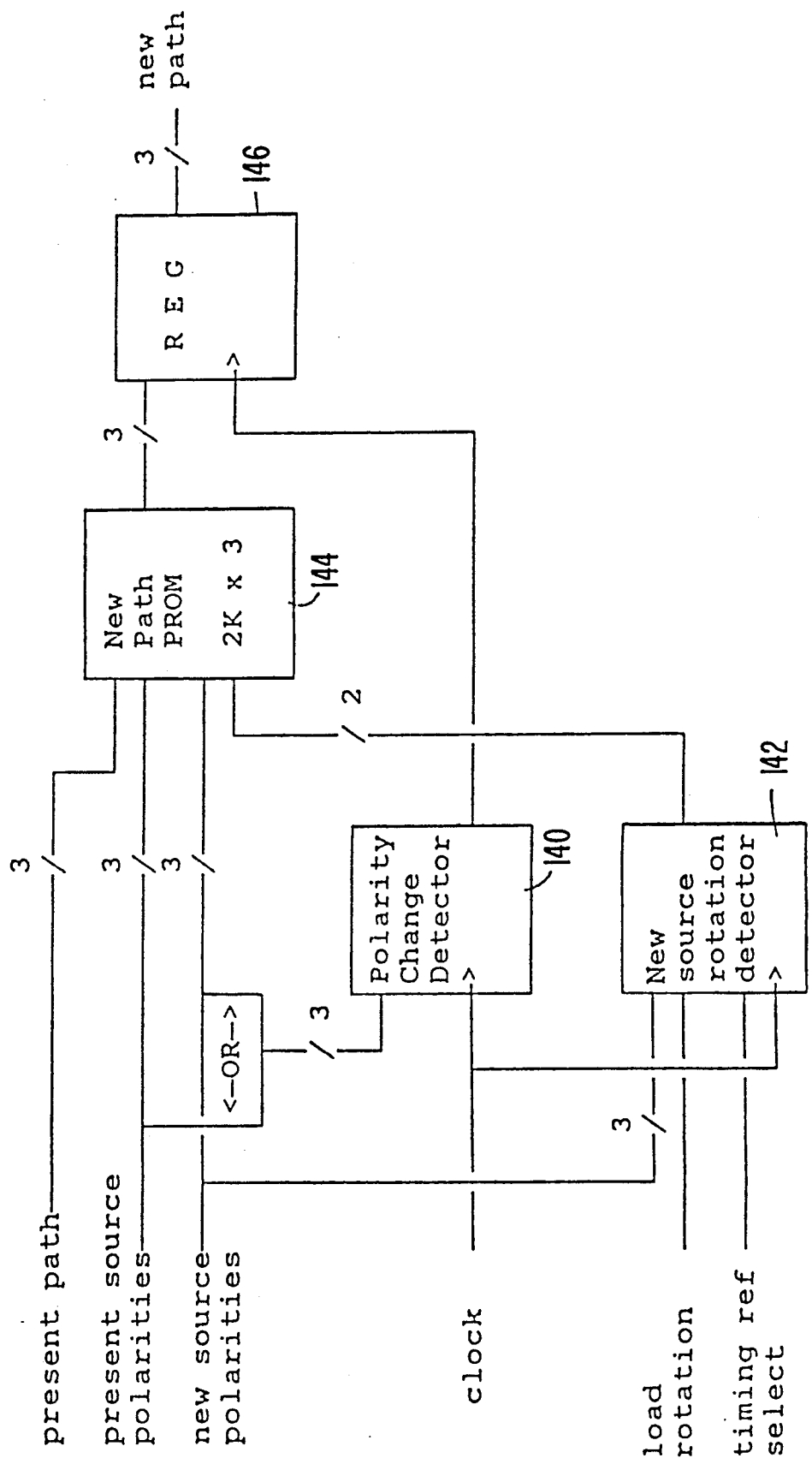
FIG. 12 is a schematic of a universal phase match path generator for 3 phase power systems using present and new source polarities and present path.

A variation of the implementation for this invention allows the present source and new source polarities to be monitored by the new path PROM. This implementation requires that the present path from the present source to the load also be provided to the new path PROM, as shown in FIG. 12. FIG. 4 can be used to find the appropriate load phase to use with FIGS. 2 and 3 for calculating the new path. In FIG. 4 the intersection of a present source phase selected and a present path yields the load phase which needs to be used in FIGS. 2 and 3.

FIGS. 5, 6, 7 and 8 are new path selection matrices which are implemented in the new path PROM. The "inputs" to these figures are the polarities of the load and new source; the "output" is the new path. The six valid polarity states are listed for each row and column (states 000 and 111 are not valid). These figures calculate the new path based on the angular position of the new source and load at a particular time. FIGS. 5 and 6 are used when a new source and load are rotating in the same direction. Other conditions which are used to determine the correct figure are described below the matrix diagram for each figure. FIGS. 7 and 8 are used when the new source and load are rotating in opposite directions. Again, other conditions which are used to determine the proper figure are listed below each matrix diagram.

Implementations where the new path is determined by the present and new source polarities and the present path are subject to the translation matrix shown in FIG. 9. The present source polarity state and the present path are "inputs" in the matrix and the load polarity state to be used in FIGS. 5, 6, 7 or 8 is the "output" of the matrix.

The device which detects changes in source or load polarity is shown in FIG. 13. The polarity change detector contains a 3 bit polarity history register 160, three exclusive OR polarity compare gates 162, 164 and 166, a change compare OR gate 168 and synchronizing register 161. The polarity history register is used to store previous sample polarity data for comparison. The polarity compare gates detect a change in polarity for each phase. The change compare gate combines the detected polarity change into a single data bit. The synchronizing register is used to align the polarity change data with the clock, and holds the change bit active for one clock cycle.

The device which generates a new source path selection from present and new source polarities and the present path is shown in FIG. 12. The path generator contains a polarity change detector 150, a new source rotation detector 152, a 2048×3 new path PROM 154, and a new path register 156.

The polarity change detector 150 is shown in FIG. 13. The new source rotation detector 152 is shown in FIG. 14. The new path PROM 154 calculates the new path from the present path, present source polarities and new source polarities as shown in the matrices in FIGS. 5-8. The new path register 156 synchronizes the new path to the output of the polarity change detector. The polarity change detector can operate with either the present source polarities or the new source polarities.

Figure 11:
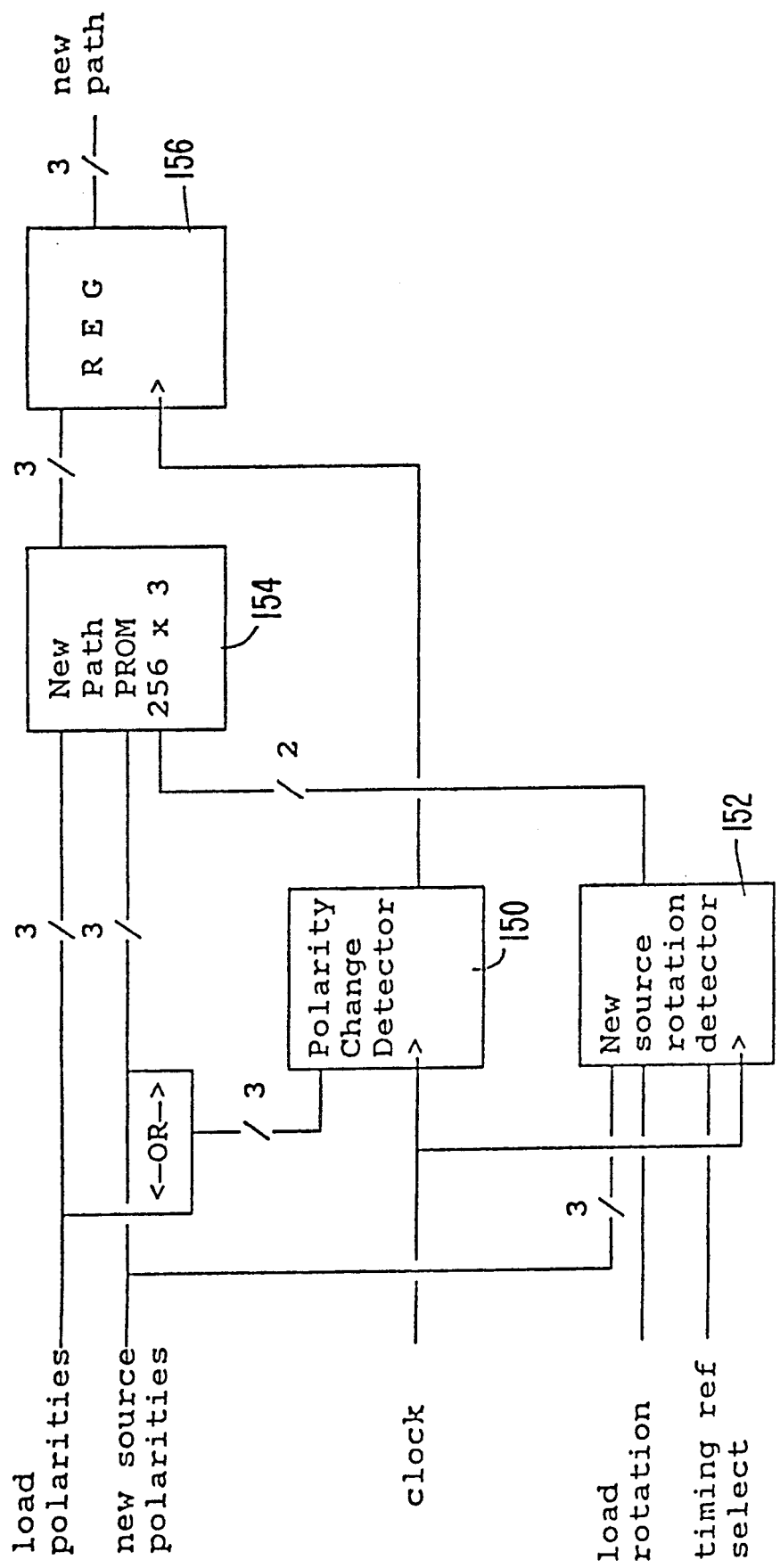
FIG. 11 is a schematic showing a universal phase matching generator for 3 phase power systems using new source and load polarities.

The device which generates a new source path selection from load and new source polarities is shown in FIG. 11. The path generator contains a polarity change detector 140, a new source rotation detector 142, a 256×3 new path PROM 144, and a new path register 146.

The polarity change detector 140 is shown in FIG. 13. The new source rotation detector 142 is shown in FIG. 14 The new path PROM 144 calculates the new path from the load polarities and the new source polarities as shown in the matrices in FIGS. 5-8. The new path register 146 synchronizes the new path to the output of the polarity change detector. The polarity change detector can operate with either the load polarities or the new source polarities.

The four selection matrices are different, and apply to different system configurations. The device which selects the proper selection matrix based on an analysis of the system configuration is the new source rotation detector, shown in FIG. 14. The new source rotation detector contains a 3 bit polarity history register 170, a 128×2 PROM 172, a 1 bit rotation history register 174, and 2 exclusive OR gates 176 and 178. The rotation PROM analyzes the rotation history (the known rotation direction from the previous clock cycle), the real-time new source polarities (prior to the next clock cycle) and the new source polarity history (from the previous clock cycle).

The rotation PROM checks the real-time polarities of a new source and compares them to the polarities from the previous clock cycle. If the value matches, then the known rotation direction is maintained. If the values do not match, then the PROM checks to make sure the real-time polarity is allowable in accordance with the polarity sequence for the know rotation direction. If the sequence is allowable, the rotation direction is maintained. If the sequence is not allowable, a "rotation error" is detected and an output signal set for processing by system maintenance circuitry.

The exclusive OR gates 176 and 178 produce the select lines for the matrices which are implemented in the new path PROM and which are shown in FIGS. 5-8. The first exclusive OR gate 176 operates on the "load rotation" configuration value and the output of this gate is logically true when the rotation of the new source is the opposite of the rotation of the load. The output signal is called "reverse" and is connected to an input of the new path PROM.

The second exclusive OR gate 178 operates on the "timing reference select " configuration value and the "load rotation" configuration value. For example, suppose that the timing reference configuration is defined to be logically active when the present source or load is used as a timing reference and logically inactive when the new source is used as a timing reference, and the load rotation configuration is defined to be logically active when a load rotation is ACB and logically inactive when a load rotation is ABC. The output of the exclusive OR gate then is logically true when the load has ACB rotation AND the timing reference is the present source or load or the load has ABC rotation and the new source is the timing reference. This output signal is called "solution select" and is connected to an input of a new path PROM.

FIG. 10 summarizes the function of the new source rotation detector. The inputs are the timing reference, the new source rotation and the desired load rotation. The output identifies the correct solution matrix to use (FIGS. 5-8) for the given system configuration.

To use the invention the assumption is made that the following information is known for the power system configuration before the new path may be calculated:

desired rotation of load (ABC OR ACB) which establishes the value that is used to configure "load rotation" value;

timing reference (present source/load or new source) which establishes the value to be used for "timing reference select"; and, monitored polarities are either the load and new source or present and new source which established if the implementation is represented by FIG. 11 or 12. If FIG. 12 is the correct representation, then FIG. 9 must be used to translate present source polarity to load polarity for using FIGS. 5–8.

Using the configuration data given, the following operations are performed:

1) the correct matrix is identified using FIG. 10.

2) the angular position of the selected timing reference device is identified by the polarity state.

3) if the reference polarity state is from the present source, FIG. 8 is used to determine the load polarity state to use in the solution matrix identified in step 1.

4) the polarity states of the new source and load at the time of the transfer initiation are used in the selected solution matrix to determine the new path.

The PROMs implement the functions identified above and shown in the figures. The PROM code is dependent upon implementation, but does not alter the principles of the invention. Logical "0" or "1" assignments were chosen for convenience of use. "X" in the rotation PROM listing means the output value can be either "1" or "0". In these situations, it is assumed that the rotation error signal will be processed, which would indicate that there is a flaw in the hardware that generates the polarity signals. In the 2K×3 new path PROM, a present path of 00 is interpreted to be when the load is off (no current is being provided to load). This would be a start up state. In this situation, the new path is assumed to be:

Number 1 if valid polarities are present and "reverse" is logically inactive or

Number 4 if valid polarities are present and "reverse" is logically active.

Polarity values of 000 or 111 are considered to be invalid.

Although a specific embodiment has been disclosed, it will be understood by those having skill in the art that changes can be made to the specific embodiment without departing from the spirit and scope of the invention.

What is claimed is:

1. A digital phase match discriminator for matching a first multi-phase power source connected to a load to a second multi-phase power source to be connected to the load by choosing the best phase path for the second multi-phase power source, wherein the first power source, second power source and load can be rotating in opposite directions with respect to each other, comprising:

a first control signal indicative of the desired rotation of the load;

a second control signal indicative of a selected timing reference based on the first or second power source or load;

a logic network for monitoring each phase voltage of the first multi-phase source, second multi-phase source and the load and receiving the first and second control signals, for producing an output based on the voltage polarities of the phases of the first multi-phase source, the second multi-phase source and the load;

a storage element for receiving an output from the logic network path solution between the second multi-phase power source and the load; and said logic network updating the best phase path solution contained in the storage element each time any phase of the load changes polarity.

2. A method of phase matching a first multi-phase power source connected to a load to a second multi-phase power source to be connected to the load by choosing the best phase path for the second multi-phase power source, wherein the first power source and second power source can be rotating in opposite directions with respect to each other or with respect to the load, comprising the steps of:

generating a first control signal indicative of the desired rotation of the load;

generating a second control signal indicative of a timing reference selected from the first or second power source or load;

monitoring the phase voltage of the first multi-phase power source, the second multi-phase power source and the load;

determining the best phase path solution from a logic network based on the voltage polarities of the phases of the first and second multi-phase power sources and the load and the first and second control signals; and storing a value from the logic network indicative of the best phase path solution between the second multi-phase source and the load and the first and second control signals; and updating the stored value each time any phase of the load changes polarity.

3. A system for transferring power from a first multi-phase power source connected to a load to a second multi-phase power source to be connected to the load by choosing the best phase path for the second multi-phase power source, wherein the first power source, second power source and load can be rotating in opposite directions with respect to each other, comprising:

first control signal indicative of the desired rotation of the load;

second control signal indicative of a selected timing reference based on the first or second power source or load;

logic means for monitoring each phase voltage of the first multi-phase power source, second multi-phase power source and load and first and second control signals, for producing an output based on the voltage polarities of the phases of the first multi-phase source, the second multi-phase source and the load;

storage means for storing a value from the logic means indicative of the best phase path solution between the second multi-phase source and the load; and means for updating the stored value each time any phase of the load changes polarity.

* * * * *